(12) United States Patent
Shigematsu et al.

(10) Patent No.: US 7,576,172 B2
(45) Date of Patent: Aug. 18, 2009

(54) METHOD OF PREPARING ALIPHATIC POLYMER HAVING KETONE GROUP IN MAIN CHAIN THEREOF AND METHOD OF PREPARING COMPOSITION CONTAINING THE SAME

(75) Inventors: Taishi Shigematsu, Ashigarakami-gun (JP); Chikara Manabe, Ashigarakami-gun (JP); Masaki Hirakata, Ashigarakami-gun (JP); Kentaro Kishi, Ashigarakami-gun (JP); Miho Watanabe, Ashigarakami-gun (JP); Hiroyuki Watanabe, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 478 days.

(21) Appl. No.: 10/568,428

(22) PCT Filed: Apr. 30, 2004

(86) PCT No.: PCT/JP2004/006337

§ 371 (c)(1),
(2), (4) Date: Feb. 14, 2006

(87) PCT Pub. No.: WO2005/042617

PCT Pub. Date: May 12, 2005

(65) Prior Publication Data

US 2006/0252907 A1    Nov. 9, 2006

(30) Foreign Application Priority Data

Oct. 31, 2003    (JP) .............................. 2003-373289

(51) Int. Cl.
| | |
|---|---|
| C08G 65/34 | (2006.01) |
| C08G 2/00 | (2006.01) |
| C08G 4/00 | (2006.01) |
| C08G 6/00 | (2006.01) |
| C08G 10/00 | (2006.01) |
| C08G 12/00 | (2006.01) |
| C08G 14/00 | (2006.01) |
| C08G 16/00 | (2006.01) |
| C23C 14/12 | (2006.01) |
| C23C 14/10 | (2006.01) |
| C08K 3/00 | (2006.01) |
| H01B 1/12 | (2006.01) |
| B60C 1/00 | (2006.01) |
| C08K 3/04 | (2006.01) |

(52) U.S. Cl. ...................... 528/425; 528/220; 427/525; 524/401; 524/496

(58) Field of Classification Search ................. 528/220, 528/425
See application file for complete search history.

(56) References Cited

U.S. PATENT DOCUMENTS 3,849,515 A * 11/1974 Muller ....................... 528/274

(Continued)

FOREIGN PATENT DOCUMENTS

EP    0 599 415 A1    6/1994

(Continued)

OTHER PUBLICATIONS

C. Bianchini et al., "Copolymerization of Carbon Monoxide with Ethene Catalyzed by Palladium(II) Complexes of 1,3-Bis(diphenylphosphino)propane Ligands Bearing Different Substituents on the Carbon Backbone" Macromolecules 32, pp. 4183-4193, 1999.

*Primary Examiner*—Mark Eashoo
*Assistant Examiner*—Liam J Heincer
(74) *Attorney, Agent, or Firm*—Oliff & Berridge, PLC

(57) ABSTRACT

The present invention discloses a method of synthesizing an aliphatic polymer having a ketone group in the main chain thereof, in which polyhydric alcohol (for example, glycerin) as a raw material is polymerized in the presence of a catalyst, and a method of preparing a composition containing an aliphatic polymer having a ketone group in the main chain thereof, including such a process.

29 Claims, 4 Drawing Sheets

U.S. PATENT DOCUMENTS

| | | | |
|---|---|---|---|
| 4,835,250 | A | 5/1989 | Drent |
| 2002/0007043 | A1 | 1/2002 | Sunkara et al. |
| 2003/0213979 | A1 * | 11/2003 | Nakajima et al. ........... 257/200 |

FOREIGN PATENT DOCUMENTS

| | | | |
|---|---|---|---|
| GB | | 1458570 * | 11/1974 |
| JP | A | 8-244176 | 9/1996 |
| JP | A | 9-59506 | 3/1997 |
| JP | A | 11-3931 | 1/1999 |
| JP | A | 11-181081 | 7/1999 |
| JP | A | 2003-517071 | 5/2003 |
| JP | A | 2004-059826 | 2/2004 |
| JP | A | 2004-182974 | 7/2004 |

* cited by examiner

METHOD OF PREPARING ALIPHATIC POLYMER HAVING KETONE GROUP IN MAIN CHAIN THEREOF AND METHOD OF PREPARING COMPOSITION CONTAINING THE SAME

TECHNICAL FIELD

The present invention relates to a method of preparing a polymer which is used as a material such as engineering plastic, and more particularly to a method of preparing a composition containing an aliphatic polymer having a ketone group in the main chain thereof.

BACKGROUND ART

Being stable organic materials which can be used for industrial production, plastics have been applied for various purposes.

In particular, among plastics, a so-called "engineering plastic" has excellent mechanical strength and heat resistance and can replace metallic materials, unlike general plastics such as polyethylene or polystyrene. In recent years, engineering plastic has been put into practice in various industrial contexts as an excellent functional material. Among engineering plastics, those such as polyamide, polyethylene terephthalate, polycarbonate, polyacetal, and polyphenylene ether are called "general engineering plastics", and can provide reasonable performance and inexpensive price, and, accordingly, large amount of general engineering plastics are used in industry.

Other than general engineering plastics, plastics having extremely excellent mechanical strength and heat resistance are called "special engineering plastics or super engineering plastics", and application thereof is limited from the standpoint of the cost or formability thereof.

Examples of special engineering plastics include polyimides, polysulfones, all-aromatic polyesters, crystalline polyesters, polyketones, cyanates, and polyphenylenesulfides.

Among engineering plastics, polyketone is a polymer having a ketone group in the main chain thereof. Main examples of polyketone include polyether ketone (hereinafter, PEK), polyether ether ketone (hereinafter, PEEK), and polyether ketone ketone (hereinafter, PEKK), and polyallyl ether ketone and aliphatic polyketone as composites thereof.

Polyallyl ether ketone is a heat-resistant polymer to which injection molding can be applied. The ratio of rigid ketone groups to flexible ether bonds is a factor for determining heat resistance of the polymer. Further, PEK or PEEK having a high proportion of ketone groups has high heat resistance, the thermal deformation temperature of PEK or PEEK ranges from about 300° C. to about 350° C., the continuous duty temperature thereof ranges from 200° C. to 260° C., and among thermoplastics, PEK or PEEK exhibits most excellent heat resistance. PEEK has a melting point of 334° C., and exhibits high resistance to hydrolysis, high chemical resistance, high radiation resistance, and incombustibility and, accordingly, is used for airplanes, atomic power generation, electronics such as computers, cable-coating materials, connectors, engine peripheral parts for automobiles, and hot water pump housings. PEK can exhibit higher heat resistance, chemical resistance, incombustibility, and radiation resistance than PEEK, and is used for atomic power generation and airplane-associated parts.

However, since these PEK and PEEK are made from expensive monomers serving as raw materials, there is little room for cost reduction, and thus it is expected that large-scale market production thereof might be difficult even in the future.

Condensed engineering plastic containing an aromatic ring in the main chain thereof has conventionally been synthesized due to a condensation reaction between two functional groups. However, in recent years, new synthesizing methods in which large ring compounds are ring-opening polymerized or they are directly polymerized by dehydrogenation have been frequently reported.

On the other hand, attention has been drawn to polyketone which does not contain an aromatic ring in its molecule or so-called aliphatic polyketones. Aliphatic polyketone (product name "Caliron") which is developed and manufactured by Shell Oil Co., Ltd. is a special engineering plastic. Since the aliphatic polyketone does not contain an aromatic ring in its molecule and can be manufactured from inexpensive raw materials, olefin such as ethylene, and CO, a wide range of applications can be expected. Examples of applications of the aliphatic polyketone include: packaging, containers, electric members, electronic components, automobile members, building materials, gears, slide characteristic parts, adhesives, and fibers, and in these industrial fields, aliphatic polyketone is receiving much attention.

At present, aliphatic polyketone is mainly synthesized by a method in which olefin such as ethylene or propylene and carbon monoxide are copolymerized in the presence of a catalyst such as a metal complex, for example palladium, nickel or cobalt (see U.S. Pat. No. 4,835,250, for example). However, at present, the synthesis of these metal complexes is very difficult. For instance, C. Bianchini, et. al., Macromolecules 32, pp. 4183-4193 (1999) discloses a synthesis method of a palladium complex.

However, since a petroleum raw material is used in the above synthesis, there is a need to undergo a complicated reaction process including 5 steps or more, which increases the manufacturing cost.

Among aliphatic polyketones, synthesis of a polyether ketone polymer such as aliphatic polyether ketone or polyether ether ketone has not yet been reported.

Accordingly, there is a need for a method of preparing an aliphatic polymer having a ketone group in the main chain thereof, which can be used for a material such as engineering plastic, from a raw material which is easy to handle, and a method of preparing a composition using the same.

DISCLOSURE OF INVENTION

A first aspect of the present invention provides a method of preparing an aliphatic polymer having a ketone group in the main chain thereof, wherein polyhydric alcohol as a raw material is polymerized in the presence of a catalyst.

Further, a second aspect of the present invention provides a method of preparing a composition containing the aliphatic polymer having a ketone group in the main chain thereof, including a step of polymerizing polyhydric alcohol as a raw material in the presence of a catalyst.

BRIEF DESCRIPTION OF DRAWINGS

Preferable embodiments of the present invention will be explained in more detail on the basis of the following drawings.

BEST MODE FOR CARRYING OUT THE INVENTION

Figure 1:
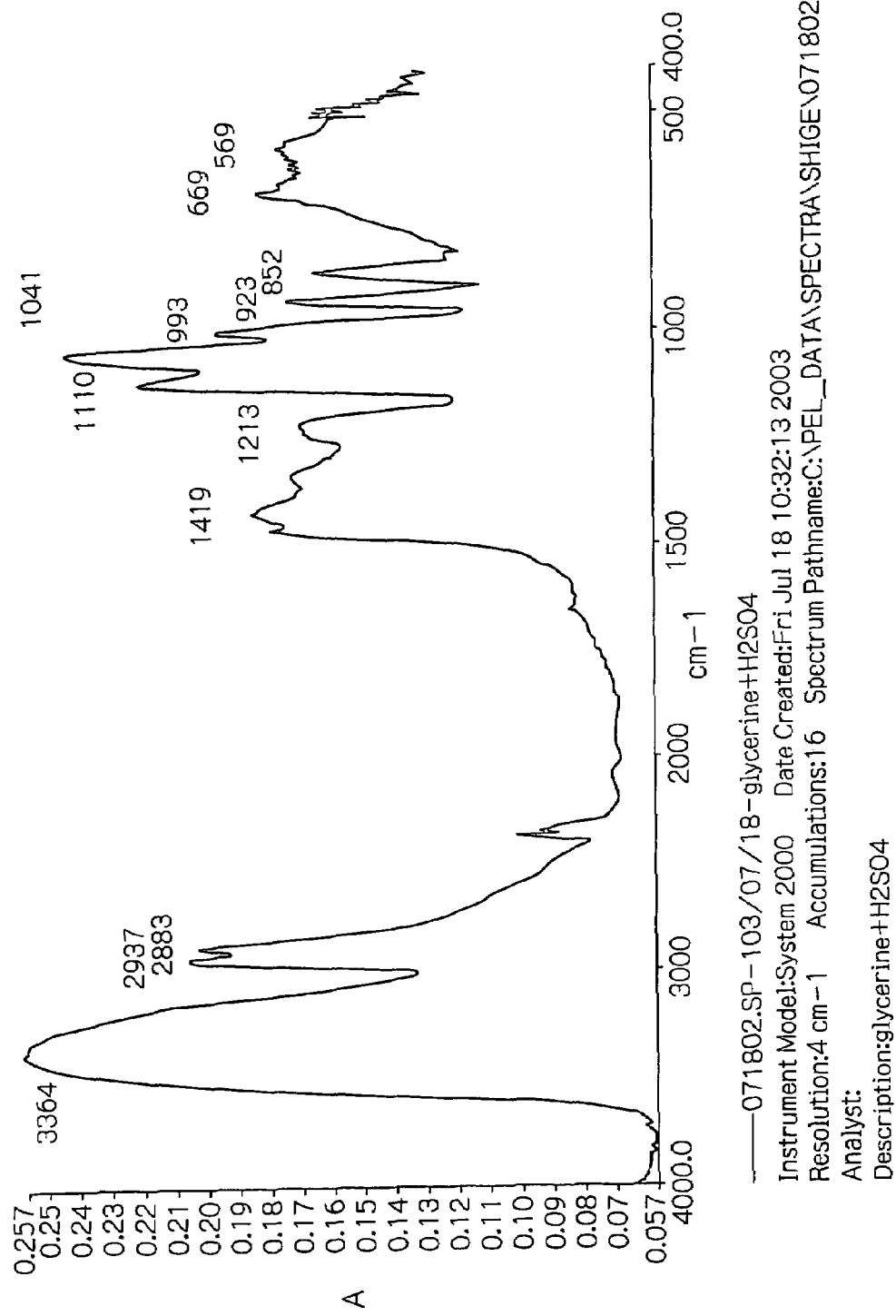
FIG. 1 shows the infrared absorption spectrum of a mixture of glycerin and sulfuric acid used in Example 1.

Hereinafter, the present invention will be explained in detail.

In the method of preparing an aliphatic polymer having a ketone group in the main chain thereof of the present invention, polyhydric alcohol serving as a raw material is polymerized in the presence of a catalyst, whereby the ketone group for enhancing hardness of a polymer can be synthesized from the polyhydric alcohol. In particular, since rather than petroleum, a polyhydric alcohol which is easier to handle than the petroleum, is used as a raw material in preparing a polyether ketone polymer including a ketone group and an ether group but containing no aromatic group, a reaction step is simple, and eco-friendly. For this reason, the method of preparing an aliphatic polymer according to the present invention is suitable for industrial production.

In the method of preparing a polymer of the present invention, due to polymerization-reaction accompanied by oxidation reaction, the aliphatic polymer having a ketone group in the main chain thereof can be obtained. Further, when polymerization-reaction further accompanied by dehydration reaction is made to occur, an aliphatic polyether ketone polymer can be obtained. Accordingly, in preparing a polyketone polymer from a polyhydric alcohol, an oxidation catalyst is used. On the other hand, in preparing a polyether ketone polymer from a polyhydric alcohol, a dehydration oxidation catalyst is used. However, when polyether polyol is used as the polyhydric alcohol in preparing a polyether ketone polymer, an oxidation catalyst or a dehydration oxidation catalyst can be used. Here, the oxidation catalyst stands for a catalyst which oxidizes a secondary hydroxyl group and then dehydrates and condenses hydroxyl groups. Although the catalyst can be liquid or solid, the catalyst is preferably in the form of an aqueous solution. This is because such a catalyst and polyhydric alcohol can be easily mixed with each other and catalytic action can be generated suitably. It is also preferable that the catalyst is volatilized at a temperature equal to or less than the thermal decomposition temperature of the polymer. Alternately, in the case of a nonvolatile catalyst, it is preferable that the catalyst is thermally decomposed at a temperature equal to or less than the thermal decomposition temperature of the polymer, which enables the whole or a part of such a catalyst to be removed from the polymer. Such a catalyst can be selected from sulfuric acid, nitric acid, hydrogen peroxide, $Na_2Cr_2O_7$, $CrO_3Cl$, and NaOCl. The catalyst is particularly preferably sulfuric acid because the sulfuric acid can efficiently cause the dehydration reaction and the oxidation reaction, is inexpensive, and is easy to handle.

The amount of the catalyst used (or added) per gram of the raw material is preferably in the range of 0.1 to 100 mg, more preferably in the range of 0.5 to 80 mg, and still more preferably in the range of 5 to 50 mg. When the amount is too small, it may be difficult to cause the polymerization reaction. Meanwhile, when the amount is too large, a foamed polymer (composition) may be obtained.

The polyhydric alcohol serving as a raw material preferably contains secondary alcohol and primary alcohol in a single molecule. Examples of the polyhydric alcohol include: glycerin, 1,3,5-trihydroxypentane, and 1,2,4-trihydroxybutane, and 1,2,6-trihydroxyhexane. Use of glycerin is particularly preferable because glycerin is inexpensive, and eco-friendly, and can easily cause the polymerization reaction using a dehydration and oxidation reaction catalyst.

Since it is comparatively easy to polymerize polyhydric alcohol, not a simple polyhydric alcohol substance but a polymer of the polyhydric alcohol (e.g. polyglycerin) can be used as a raw material. However, when a polyether ketone polymer is synthesized by using a polyhydric alcohol monomer and a dehydration and oxidation catalyst, the dehydration reaction and the oxidation reaction can be simultaneously caused, simplifying the step of synthesizing polyether polyol. For this reason, use of the monomer is more preferable than that of the polymer as long as the monomer is easy to handle.

In the polyether ketone polymer, typically, a ketone group enhances hardness of the polymer, while an ether group enhances flexibility of the polymer. Accordingly, by controlling the respective numbers of the ketone groups and the ether groups, mechanical properties, such as hardness, of the polymer can be controlled. In other words, increasing the proportion of the ether bonds in the polymer results in improved flexibility of the polymer, whereas increasing the proportion of the ketone groups in the polymer leads to improved hardness of the polymer.

In the method of the present invention, the polyhydric alcohol serving as a raw material produces a ketone group only. Accordingly, when a mixture of polyhydric alcohol and a diol compound (such as ethylene glycol) is used as a raw material and polymerized, the proportion of ether bonds in the polymer molecule can be increased. This is because only ether bond is generated from the diol compound. Accordingly, by changing the mixing ratio of the polyhydric alcohol and the diol compound, the flexibility of the resultant polymer can be controlled.

For example, if glycerin serving as a polyhydric alcohol, and a diol compound are alternately polymerized, polyether ether ketone can be obtained, as represented by the following reaction formula.

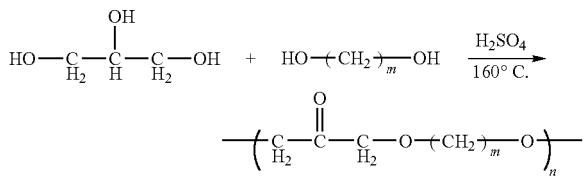

Further, a block copolymer of polyether ketone and polyether (a block copolymer of a structural unit represented by formula (1) and a structural unit represented by formula (3) which will be described later) can be formed from plural glycerin polymeric molecules serving as polyhydric alcohol and plural diol compound molecules.

In the method of preparing an aliphatic polymer having plural ketone groups in the main chain thereof of the present invention, polymerization reaction is preferably conducted such that a hydroxyl group remains in the resultant polymer. Thus, an aliphatic polymer, including a structural unit represented by formula (5) which will be described later and having ketone groups in the main chain thereof, i.e., a water soluble and stable gel substance, can be obtained.

For example, when nitric acid is used as the catalyst, and a reaction system is heated at a temperature equal to or higher than 120° C., which is the boiling point of the nitric acid, and the nitric acid serving as the catalyst is removed before complete polymerization of the raw material (such as glycerin or diol), a part of hydroxyl groups are not used for the synthesis of ketone groups, whereby a gel high polymer in which hydroxyl groups partially remains can be obtained.

Since the gel substance (high molecular gel) has viscosity, and is unlikely to flow during the application or formation thereof, it is suitable for forming films or structures. By adding sulfuric acid to the high polymer gel, coating or forming the resultant mixture, and then heating the mixture layer to, for example, about 150° C., a hardened polymer can be prepared.

In order to cause the polymerization reaction, the reaction system is preferably heated as well as the above-described catalyst being used. A method for heating the reaction system is not particularly limited. However, it is preferable to heat the reaction system by electromagnetic waves because the polymerization reaction can occur efficiently.

With reference to embodiments, the method of preparing an aliphatic polymer having a ketone group in the main chain thereof according to the present invention will be explained.

For example, when glycerin is used as a raw material and sulfuric acid is used as a dehydration catalyst, dehydration/condensation reaction between primary alcohols and oxidation reaction between secondary alcohols occur, as shown in the following reaction formula. In the dehydration/condensation reaction, due to the dehydration action of sulfuric acid, a water molecule is eliminated from two primary alcohols of glycerin molecules, whereby an ether bond is generated. In the oxidation reaction, two hydrogen atoms are eliminated from =CHOH group of the secondary alcohol, whereby a ketone group is produced.

The product generated at this time is aliphatic polyether ketone. A hydroxyl group may be present in this product, as described above. Further, the hydroxyl group can be chemically modified by a molecule having a functional group which can react with the hydroxyl group. Moreover, the primary alcohol and the secondary alcohol may dehydrate and condense, or the secondary alcohol molecules may dehydrate and condense.

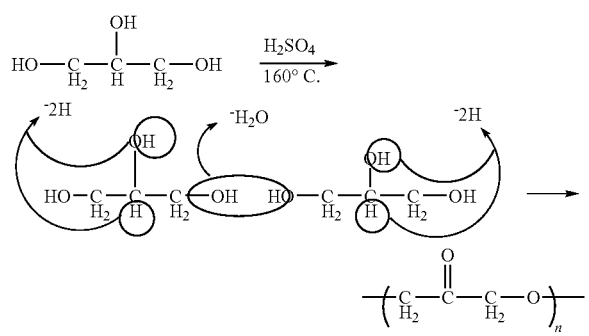

In this way, the aliphatic polymer having a ketone group in the main chain thereof, which can be used for a material such as engineering plastic, can be synthesized from a raw material which is easy to handle.

A polyether ketone polymer which is particularly suitably obtained by the method of preparing an aliphatic polymer having a ketone group in the main chain thereof of the present invention will be explained hereinafter.

The aliphatic polyether ketone polymer has as a fundamental skeleton a structural unit represented by the following formula (1), and does not include an aromatic ring. Ketone groups which are responsible for hardening a polymer and ether bonds which are responsible for softening a polymer are present in the aliphatic polyether ketone polymer. By controlling the respective numbers of the ketone groups and the ether bonds, mechanical properties, such as hardness, of a polymer can be controlled while thermal stability is maintained. Accordingly, the aliphatic polyether ketone polymer is useful as a material such as engineering plastic.

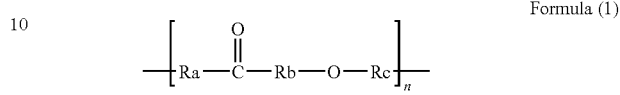

Formula (1)

In formula (1), Ra and Rb independently represent a substituted or unsubstituted divalent aliphatic hydrocarbon group, and Rc represents a substituted or unsubstituted divalent aliphatic hydrocarbon group having an ether bond in the terminal thereof, or a single bond. n represents an integer of 2 to 10,000. The polymer may have a portion in which the ketone group C=O in formula (1) is replaced with a CHOH group (see formula (5)). Moreover, the polymer, together with another polymer, can form a block copolymer.

Examples of the divalent aliphatic hydrocarbon group include those having 1 to 20 carbon atoms. Such an aliphatic hydrocarbon group may be linear or branched or a ring. However, the aliphatic hydrocarbon group is preferably linear. Examples of the linear aliphatic hydrocarbon group include alkyl chains having 1 to 20 carbon atoms. Examples of the divalent aliphatic hydrocarbon group having an ether bond in the terminal thereof include those which have an ether bond (—O—) in the terminal of these aliphatic hydrocarbon groups.

Examples of a substituent that the divalent aliphatic hydrocarbon group may have include: —COOR, —COX, —MgX, —X, —OR, —NR$^1$R$^2$, —NCO, —NCS, —COOH, —OH, —O, —NH$_2$, —SH, —SO$_3$H, —R'CHOH, —CHO, —CN, —COSH, —SR, and —SiR'$_3$. Here, X represents halogen, and R, R$^1$, R$^2$, and R' independently represent a substituted or unsubstituted hydrocarbon group.

Specific examples of Ra and Rb include: —CH$_2$—, —CHNH$_2$—, —C(NH$_2$)$_2$—, —CHCN—, —C(CN)$_2$—, —CHOH—, —C(OH)$_2$—, —CO—, —CHSH—, —C(SH)$_2$—, —CHCOOH—, —C(COOH)$_2$—, —CHX—, and —CX$_2$—, and repetitions or combinations thereof can also be used. Here, X represents halogen.

On the other hand, specific examples of Rc include a single bond and substituted or unsubstituted divalent aliphatic hydrocarbon groups represented by —Rc'-O— and having an ether bond in the terminal thereof. Examples of Rc' include: —CH$_2$—, —CH$_2$—, —CHNH$_2$—, —C(NH$_2$)$_2$—, —CHCN—, —C(CN)$_2$—, —CHOH—, —C(OH)$_2$—, —CHSH—, —C(SH)$_2$—, —CHCOOH—, —C(COOH)$_2$—, —CHX—, and —CX$_2$—, and repetitions or combinations thereof can also be used. Further, repetitions of —Rc'-O— or combinations of plural —Rc'-O— structures having different Rc's can be used. Here, X represents halogen.

When glycerin is used as the polyhydric alcohol, a polyether ketone polymer in which the structural unit represented by formula (1) is a structural unit represented by the following structural formula (2) can be obtained. In structural formula (2), n represents an integer of 2 to 10,000.

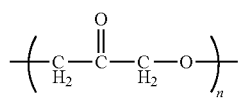

Structural formula (2)

When glycerin and ethylene glycol are used as the polyhydric alcohols, or raw materials, a polyether ether ketone polymer having a structural unit represented by structural formula (3) can be obtained. In the following structural formula (3), m represents an integer of 1 to 20, and n represents an integer of 2 to 10,000.

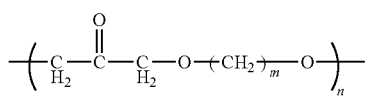

Structural formula (3)

An example of the polyether ketone polymer is a polymer in which the structural unit represented by formula (1) is that represented by the following structural formula. In the structural formula, m1, m2, and m3 independently represent an integer of 1 to 20, and n represents an integer of 2 to 10,000.

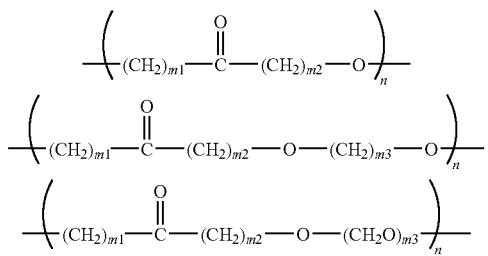

The terminal of the aliphatic polyether ketone polymer can be selected from a group consisting of —OH, —COOH, —COOR(R represents a substituted or unsubstituted hydrocarbon group), —COX (X represents a halogen atom), —NH$_2$ and NCO.

The weight-average molecular weight of the aliphatic polyether ketone polymer is preferably in the range of 84 to 1,000,000, and more preferably in the range of 500 to 500,000, and still more preferably in the range of 1,000 to 100,000.

The ratio of the ether bonds to ketone groups (ether bonds/ketone groups) in the aliphatic polyether ketone polymer is preferably in the range of 0.01 to 100, and more preferably in the range of 0.04 to 25.

Further, as described above, a ketone group enhances the hardness of a polymer while an ether group enhances the flexibility of a polymer. Accordingly, the mechanical strength of the composition can be controlled by controlling the number of ketone groups and that of ether groups in the polymer.

By the method of the present invention, an aliphatic polymer having the structural unit represented by formula (1) in its chain and having a ketone group in the main chain thereof can be synthesized from polyhydric alcohol serving as a raw material. Further, a polymer in which a single structural unit represented by formula (1) is repeated can be synthesized or a polymer of plural structural units each represented by formula (1) in which at least one of Ra, Rb and Rc has a different structure can be synthesized.

Alternatively, a copolymer of the structural unit represented by formula (1) and another structural unit (which does not contain an aromatic group) can be synthesized.

Specific examples of these polymers include: a polymer having a structural unit represented by formula (1) and polyether represented by the following formula (4), for example, a block copolymer having these as components (block copolymer having polyether ketone sites and polyether sites). Specifically, such a polymer is, for example, a block copolymer having a polyether ketone including a structural unit represented by the structural formula (2), and polyether. In the polymer, n in formula (1), and k and l in the following formula (4) represent an integer of 1 to 20, an integer of 1 to 5,000, and an integer of 1 to 5,000, respectively. Further, in formula (4), R$_1$ and R$_2$ independently represent hydrogen or an alkyl group. Moreover, a part of the structural units each represented by formula (1) can be replaced with a structure represented by formula (5) in which a hydroxyl group remains and which will be described later.

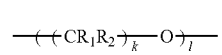

Formula (4)

The aliphatic polyether ketone polymer can be synthesized such that the polymer is provided with a cross-linking structure. By providing the polymer with a cross-linking structure in which a ketone group and an ether bond are combined with each other, it becomes possible to obtain a more mechanically and thermally stable composition. Such a polymer is, for example, a cross-linking body in which the structural unit represented by formula (1) is cross-linked with glycerin or aliphatic diol. A specific example of the polymer is a cross-linking body in which the structural unit represented by structural formula (2) is cross-linked with glycerin or an aliphatic diol compound, as represented by the following structure:

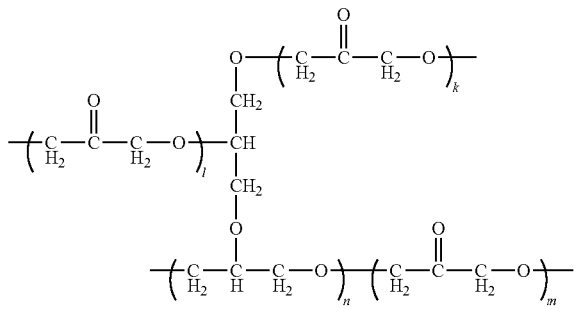

An aliphatic polymer having a ketone group in the main chain thereof which aliphatic polymer does not substantially contain a hydroxyl group is extremely chemically stable. On the other hand, an aliphatic polymer having a ketone group in the main chain thereof and containing therein a hydroxyl group is a stable and water soluble gel polymer (high polymer gel). Since the gel polymer has viscosity, and does not easily flow during the application or formation thereof, the gel polymer is suitable for preparing films or structures. A composition including a polymer which is easily hardened into a desired shape and which has a cross-linking structure can be obtained by supplying (applying or forming) the gel polymer onto a substrate and heating it. The hydroxyl group can be chemically modified by a molecule having a functional group that can react with the hydroxyl group.

The hydroxyl group is a hydroxyl group which is derived from polyhydric alcohol serving as a raw material, and which remains in the polymer without being used for the synthesis of the ketone group in the structural unit represented by formula (1). Namely, the aliphatic polyether ketone polymer can include a structural unit represented by the following formula (5) in the chain of the polymer. The structural unit represented by formula (5) partially includes sites in which the hydroxyl group which has not been used for the synthesis of the ketone group during the synthesis of the polymer remains as it is, and the structural unit represented by formula (1).

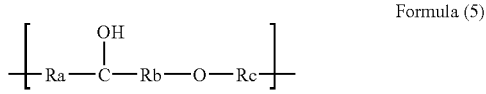

Formula (5)

In formula (5), Ra and Rb independently represent a substituted or unsubstituted divalent aliphatic hydrocarbon group, and Rc represents a substituted or unsubstituted divalent aliphatic hydrocarbon group having an ether bond in the terminal thereof, or a single bond. Further, Ra, Rb and Rc in formula (5) are the same as those in formula (1).

Further, a hydroxyl group can be included in either one or both of the structural unit represented by formula (1) and another structural unit of a block copolymer. Specifically, as shown in the following structure, for example, a block copolymer of polyether ketone having the structural unit represented by structural formula (2) and polyether (that of the structural unit represented by formula (1) and the structural unit represented by formula (4)) may have a hydroxyl group in the polyether site.

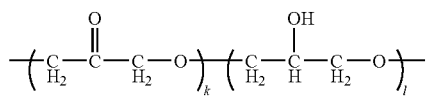

As described above, the above-described polyketone polymer can be suitably used for a material such as engineering plastic.

Method of Preparing Composition Containing Aliphatic Polymer Having Ketone Group in Main Chain Thereof.

The method of preparing a composition containing an aliphatic polymer having a ketone group in the main chain thereof of the present invention is that to which the above-described method of preparing an aliphatic polymer having a ketone group in the main chain thereof of the present invention is applied.

The method of preparing a composition containing an aliphatic polymer having a ketone group in the main chain thereof of the present invention includes the aforementioned step of polymerizing a polyhydric alcohol serving as a raw material, and the resultant composition can be used for various applications such as various engineering plastics. Further, the configuration of the composition is not particularly limited, and the resultant composition can be a molded body having an arbitrary configuration, or a film. In particular, when the polymerization reaction is conducted such that a hydroxyl group or groups remain in the resulting polymer, it is preferable that the resultant gel substance is supplied (applied or molded) onto a substrate, and then heated and hardened (cross-linked). By this, a film whose thickness is in the range of 1 nm to 1 mm, for example, can be formed easily. At this time, when the gel substance is in the form of an aqueous solution, the control of viscosity of the solution is facilitated.

Further, in the method of preparing a composition containing an aliphatic polymer having a ketone group in the main chain thereof of the present invention, electrically conductive powder can be used together with the aforementioned raw material. Since the electrically conductive powder is contained in the composition (or the aliphatic polymer having a ketone group in the main chain thereof), the composition can be used for members for electrical applications such as electrodes (including those for electrochemical measurements), electromagnetic shields, and films.

As the electrically conductive powder, fine particles of a metal such as copper, gold and silver can be appropriately used. The electrically conductive powder can be uniformly dispersed in the composition. Alternatively, the concentration of the electrically conductive powder in the surface can be higher than that in other portions.

Further, carbon nanotubes can be used as the electrically conductive powder. The carbon nanotubes have thermal conductivity as well as high electrical conductivity. Further, the carbon nanotubes also have both rigidity and flexibility because they are a gauge substance. For this reason, the carbon nanotubes being contained in the composition results in improved conductivity and flexibility of the composition, whereby the composition can be used for a wider range of applications.

A mixed solution in which the polyhydric alcohol and the electrically conductive powder are mixed with each other is preferably used at the time of synthesis. However, the polyhydric alcohol and the electrically conductive power may be separately supplied onto a substrate, a catalyst may be further supplied onto the substrate, and the synthesis can be conducted.

When a polymer or a composition is formed from a mixture in which carbon nanotubes to which a functional group that is polymerized with polyhydric alcohol is bonded is mixed with the polyhydric alcohol serving as the raw material of the polymer, polymerization may occur between the polyhydric alcohol molecules, between the polyhydric alcohol, and the functional group bonded to the carbon nanotube and/or between substituents remaining in the polymer.

Accordingly, the resultant polymer has a composite structure of the aliphatic polymer having a ketone group it its polymer, the carbon nanotubes, and a polymer of the polyhydric alcohol. Thus, since the polymers and the carbon nanotubes are in a composite state, the resultant polymer or the composition containing this polymer exhibits both high flexibility and high heat resistance.

Examples of a functional group for modifying the carbon nanotubes with which functional group polyhydric alcohol serving as the raw material of a polymer is polymerized include: —COOR, —COX and —NCO(R represents a substituted or unsubstituted hydrocarbon group, and X represents a halogen atom). When the carbon nanotubes have such a functional group, a composite polymer of the aliphatic polymer having a ketone group in the main chain thereof and the carbon nanotubes or a composition can be synthesized. When a functional group is —COOH that comparatively easily modifies the carbon nanotubes, the formation of a composite structure is facilitated.

It does not matter if carbon nanotubes are single layer-carbon nanotubes or multilayer-carbon nanotubes having two or more layers. Either or both (i.e., mixture) of the single layer-carbon nanotubes and the multilayer-carbon nanotubes can be arbitrarily selected. Further, those which are not strictly tube-shaped, such as carbon nano horns each of which is a variation of a single layer-carbon nanotube (which have a horn shape having diameters continuously increasing from one end to the other end), carbon nano coils (which have a coil shape that is entirely spiral), carbon nano beads (which have a spherical bead made of an amorphous carbon or the like and a tube penetrating the center of the bead), cup stack-type nanotubes, or carbon nanotubes (whose outer circumference is covered with a carbon nano horn and an amorphous carbon), can also be used as the carbon nanotubes.

Carbon nanotubes containing therein a certain substance, such as metal-containing nanotubes which contain therein a metal, or peapod nanotubes which contain therein fullerene or metal-containing fullerene can also be used as the carbon nanotubes.

As described above, not only ordinary carbon nanotubes but also carbon nanotubes which have an arbitrary configuration, such as variations thereof or those modified in various ways, can be used in the present invention without any problem in respect of reactivity. Consequently, all of those described above are included in the concept of "carbon nanotubes" in the present invention.

Conventionally, in preparing a structure in which carbon nanotubes are collected and brought into contact with each other to obtain an effect of interaction between the carbon nanotubes, carbon nanotube aggregates scatter and a stable structure cannot be obtained, unless the structure is sealed with a resin or the like. Further, in the case in which the structure is sealed with a resin, the application of the resin causes the carbon nanotube to flow before a patterning process, or the resin enters portions at which the carbon nanotubes contact with each other, thereby inhibits the carbon nanotubes from contacting with each other, and thus makes it impossible to obtain an effect due to the contact between the carbon nanotubes.

When a dispersion liquid in which carbon nanotubes are dispersed in a resin solution is applied to a substrate, and when the concentration of carbon nanotubes is not very high, the carbon nanotubes locally touch each other, or the size of a mesh cavity becomes larger, whereby a coating layer is formed in which the carbon nanotubes are separate from each other and which has many gaps. In such a case, the effect by containing the carbon nanotubes in the coating layer becomes insignificant.

In the present invention, for example, carbon nanotubes to which a functional group such as a —COOH group is added are dispersed in polyhydric alcohol (e.g., glycerin), which is a raw material, and a catalyst (e.g., sulfuric acid) is added to the resultant dispersion during the synthesis of the aforementioned polyether ketone polymer. When polymerization by the above-described method is initiated in this state, a structure containing carbon nanotubes at a high density can be prepared.

When the functional group is a —COOR (R is a substituted or unsubstituted hydrocarbon group), and glycerin is used as the raw material of the polymer, and if two hydroxyl groups contribute to chemical bond to the carbon nanotubes, a bonding site at which plural carbon nanotubes and polymer molecules are bonded to each other is —COOCH$_2$CHOHCH$_2$OCO— or —COOCH$_2$CH(OCO—)CH$_2$OH, and if three hydroxyl groups contribute to chemical bond to the carbon nanotubes, the bonding site is —COOCH$_2$CH(OCO—)CH$_2$OCO—. It does not matter if the chemical structure of a cross-linking site can be either one of the two groups.

In particular, when a film of a composition containing therein carbon nanotubes is formed, during the step of applying to a substrate surface a mixed solution in which carbon nanotubes having a functional group are dispersed into glycerin containing a proper amount of sulfuric acid at the room temperature, a coating film obtained from the mixed solution is formed on the entire surface of the substrate or on a part of the surface of the substrate. Then, in a subsequent polymerization step, the coating film obtained by the application is thermally hardened, and a carbon nanotube film having a mesh structure (cross-linked structure) in which plural carbon nanotubes are cross-linked with each other is formed.

Thereafter, the film-state carbon nanotube-containing composition layer is patterned to form a desired pattern. Here, since the patterning is conducted in a state in which the structure itself of the carbon nanotube-containing composition layer is already stabilized by the polymerization step, the carbon nanotubes do not scatter during the patterning step, and a desired pattern suitable for its purpose can be formed.

As for the patterning step, the following two embodiments A and B can be exemplified:

Step (embodiment) A: of patterning the carbon nanotube-containing composition layer by dry-etching the carbon nanotube-containing composition layer, which is formed on a substrate surface, in a region other than a desired pattern and by removing the carbon nanotube structure layer in the region.

This patterning step may have two steps: a step in which a mask layer (preferably, a layer of a resin such as a photoresist, or a metal mask) is provided on a region of the carbon nanotube-containing composition layer which region is to become a pattern, and a step in which a substrate surface having the carbon nanotube-containing composition layer and the mask layer laminated thereon (preferably with radicals of oxygen molecules, which can be generated by irradiating the oxygen molecules with ultraviolet rays) to remove the carbon nanotube-containing composition layer in the other region (bare region), i.e., the carbon nanotube-containing composition layer which is not covered with the mask layer. In the case in which the mask layer provided during the mask layer forming step is a layer of a resin such as a photoresist, providing a step of removing the resin layer after the removal step allows the patterned carbon nanotube-containing composition layer, i.e., the carbon nanotube-containing composition layer which is covered with the mask layer to be exposed.

Alternately, the patterning step can also be conducted by selectively irradiating the carbon nanotube-containing composition layer, which is formed on the substrate surface, in a region other than the desired pattern with ions of gas molecules, or ion beams and removing the carbon nanotube-containing composition layer in the region.

Step (embodiment) B: in which a dispersion liquid in which a dehydration catalyst such as sulfuric acid is added to a dispersion in which carbon nanotubes are dispersed in glycerin or the like (hereinafter, a carbon nanotube dispersion liquid), or a gel in which a dehydration catalyst such as sulfuric acid is added to a dispersion in which carbon nanotubes are dispersed in the aforementioned gel polymer (composition) (hereinafter, carbon nanotube dispersion gel) is prepared, a desired pattern of the dispersion liquid or the dispersion gel is printed on a substrate, and the printed carbon nanotube dispersion liquid layer or the carbon nanotube dispersion gel layer is thermally hardened.

Further, the patterning can be either one of the embodiments A and B.

In a method of preparing an aliphatic polyketones-containing composition of the present invention, the aliphatic polymer having a ketone group in the main chain thereof and obtained by the present invention can be blended with another polymer (e.g., polyether). Alternately, plural aliphatic polymers having a ketone group in the main chain thereof and having different structures (structures in which at least one of Ra, Rb, and Rc in formula (1) is different) can be blended therewith.

Hereinafter, various properties of the aliphatic polyether ketone polymer particularly preferably contained in the aliphatic polyketones-containing composition obtained by the present invention will be explained.

The decomposition temperature of the polymer is preferably in the range of 300° C. to 600° C., and more preferably in the range of 350° C. to 600° C. The decomposition temperature can be measured by a thermal weight analysis.

The modulus of elasticity is preferably in the range of 0.1 GPa to 1000 GPa, and more preferably in the range of 1 GPa to 1,000 GPa. The modulus of elasticity can be calculated from the stress obtained by applying load to a sample, and the distortion at that time.

The electrical conductivity is preferably in the range of $10^{-15}$ S/cm to 100 S/cm, and more preferably in the range of $10^{-10}$ S/cm to 100 S/cm. The electrical conductivity can be obtained from the current-voltage characteristic and the cross-sectional area of the sample.

The other properties include insolubility in a solvent such as water, alcohol, acetone, ketone, or a halogen-containing solvent at an ordinary temperature and at a normal pressure.

EXAMPLES

Hereinafter, with reference to Examples, the present invention will be explained in more detail. However, the present invention is not limited to these.

Example 1

Figure 2:
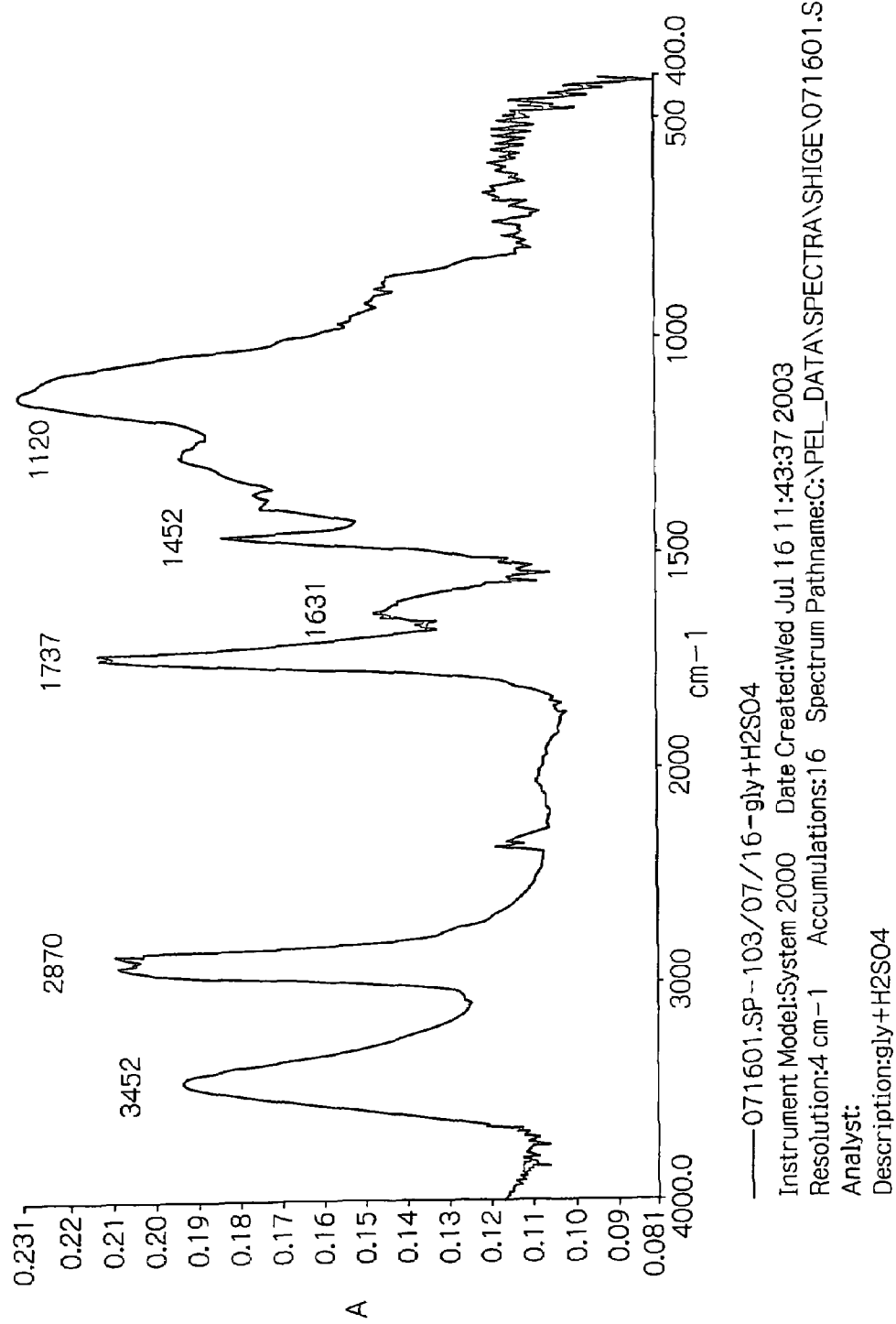
FIG. 2 shows the infrared absorption spectrum of aliphatic polyether ketone obtained in Example 1.

One ml of glycerin (manufactured by KANTO CHEMICAL Co., Inc.) serving as a raw material and 100 μl of concentrated sulfuric acid (a 96% aqueous solution, manufactured by KANTO CHEMICAL Co., Inc.) are mixed, and stirred sufficiently. One ml of this mixed solution is dripped on a glass substrate, and the resultant layer is heated at 160° C. for 15 minutes. The infrared absorption spectrum of the product thus obtained (see FIG. 2) shows absorption of a carbonyl group at 1737 $cm^{-1}$, and that of an ether group at 1120 $cm^{-1}$, which do not appear in the infrared absorption spectrum before the heating (see FIG. 1). Accordingly, it was confirmed that aliphatic polyether ketone having a structural unit represented by structural formula (2) (n of 100, weight-average molecular weight of 720, and a ratio of ether groups to ketone groups of 1/1) could be obtained. The results of elementary analysis reveals that the product includes 51 wt. % of carbon, 8 wt. % of hydrogen, and 41 wt. % of oxygen. Moreover, these values well corresponding to the calculated values of structural formula (2) (50 wt. % of carbon, 5 wt. % of hydrogen, and 44 wt. % of oxygen) shows that the aliphatic polyether ketone having the structural unit represented by structural formula (2) could be obtained.

Various properties of the aliphatic polyether ketone plastic are shown below:

| | |
|---|---|
| Modulus of elasticity: | 1 GPa |
| Thermal decomposition temperature: | 380° C. |
| Electrical conductivity: | $10^{-10}$ S/cm |

Example 1-1

Aliphatic polyether ketone in which carbon nanotubes are dispersed is obtained in the same manner as in Example 1, except that 0.15 g of carbon nanotubes modified by carboxylic acid are used as another raw material. The carbon nanotubes modified by carboxylic acid are synthesized as follows. Thirty milligrams of multilayer-carbon nanotube powder (having a purity of 90%, an average diameter of 30 nm, and an average length of 3 μm, and manufactured by Science Laboratory) is added to 20 ml of concentrated nitric acid (a 60% aqueous solution, manufactured by KANTO CHEMICAL Co., Inc.), and the resultant mixture is refluxed at 120° C. for 20 hours to synthesize a carbon nanotube carboxylic acid. After the resultant reaction solution is cooled down to room temperature, the reaction solution is centrifuged at 5,000 rpm for 15 minutes to separate the reaction solution into a supernatant and a precipitate. The precipitate is collected, and dispersed in 10 ml of pure water. The resultant dispersion liquid is centrifuged at 5,000 rpm for 15 minutes to separate the dispersion liquid into a supernatant and a precipitate, and the precipitate is washed one time. This washing operation is repeated for additional 5 times. Finally, the precipitate is collected, and carbon nanotubes modified by carboxylic acid are obtained.

Various properties of the aliphatic polyether ketone plastic in which carbon natotubes are dispersed are shown below:

| | |
|---|---|
| Modulus of elasticity: | 5 GPa |
| Thermal decomposition temperature: | 380° C. |
| Electrical conductivity: | $10^{-2}$ S/cm |

Example 2

Figure 3:
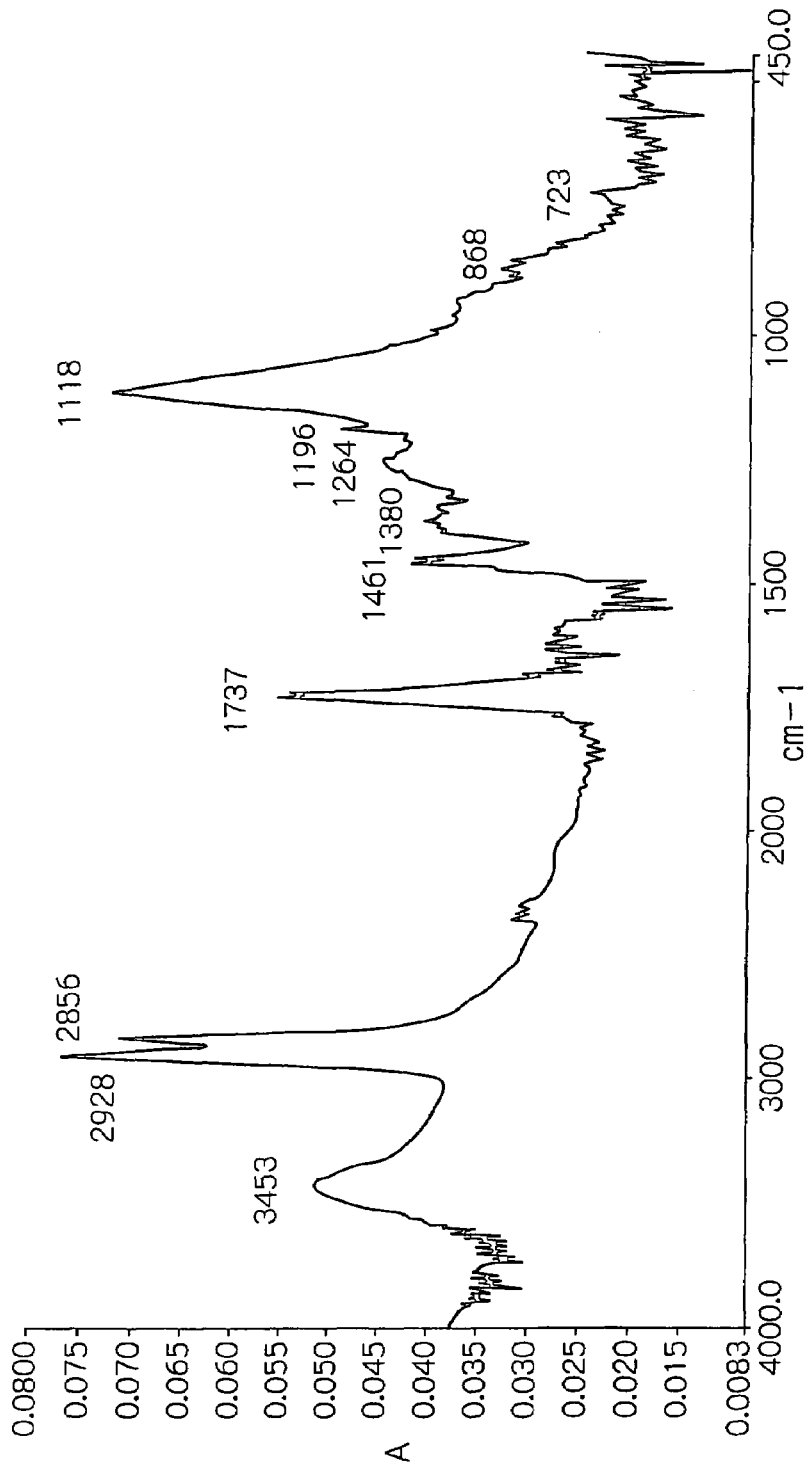
FIG. 3 shows the infrared absorption spectrum of aliphatic polyether ether ketone obtained in Example 2.

One ml of glycerin (manufactured by KANTO CHEMICAL Co., Inc.), 4 ml of 1, 10-decandiol (manufactured by KANTO CHEMICAL Co., Inc.) and 100 μl of concentrated sulfuric acid (a 96% aqueous solution, manufactured by KANTO CHEMICAL Co., Inc.) are mixed, and stirred sufficiently. One ml of the mixed solution is dripped on a glass substrate, and the resultant layer is heated at 160° C. for 15 minutes. Since the infrared absorption spectrum of the product thus obtained (see FIG. 3) shows absorption of a carbonyl group at 1737 $cm^{-1}$, and that of an ether group at 1118 $cm^{-1}$, it was confirmed that aliphatic polyether ether ketone having a structural unit represented by structural formula (3) (m of 80, n of 10, weight-average molecular weight of 18,000, and a ratio of ether groups to ketone groups of 2/1) could be obtained.

Various properties of the aliphatic polyether ether ketone plastic are shown below:

| | |
|---|---|
| Modulus of elasticity: | 1 GPa |
| Thermal decomposition temperature: | 380° C. |
| Electrical conductivity: | $10^{-10}$ S/cm |

Example 2-1

Aliphatic polyether ether ketone in which carbon nanotubes are dispersed is obtained in the same manner as in Example 2 except that 0.15 g of carbon nanotubes modified by carboxylic acid (carbon nanotubes prepared in the same manner as in Example 1-1) are used as another raw material.

Various properties of the aliphatic polyether ether ketone plastic in which carbon nanotubes are dispersed are shown below:

| | |
|---|---|
| Modulus of elasticity: | 5 GPa |
| Thermal decomposition temperature: | 380° C. |
| Electrical conductivity: | $10^{-2}$ S/cm |

Example 3

Figure 4:
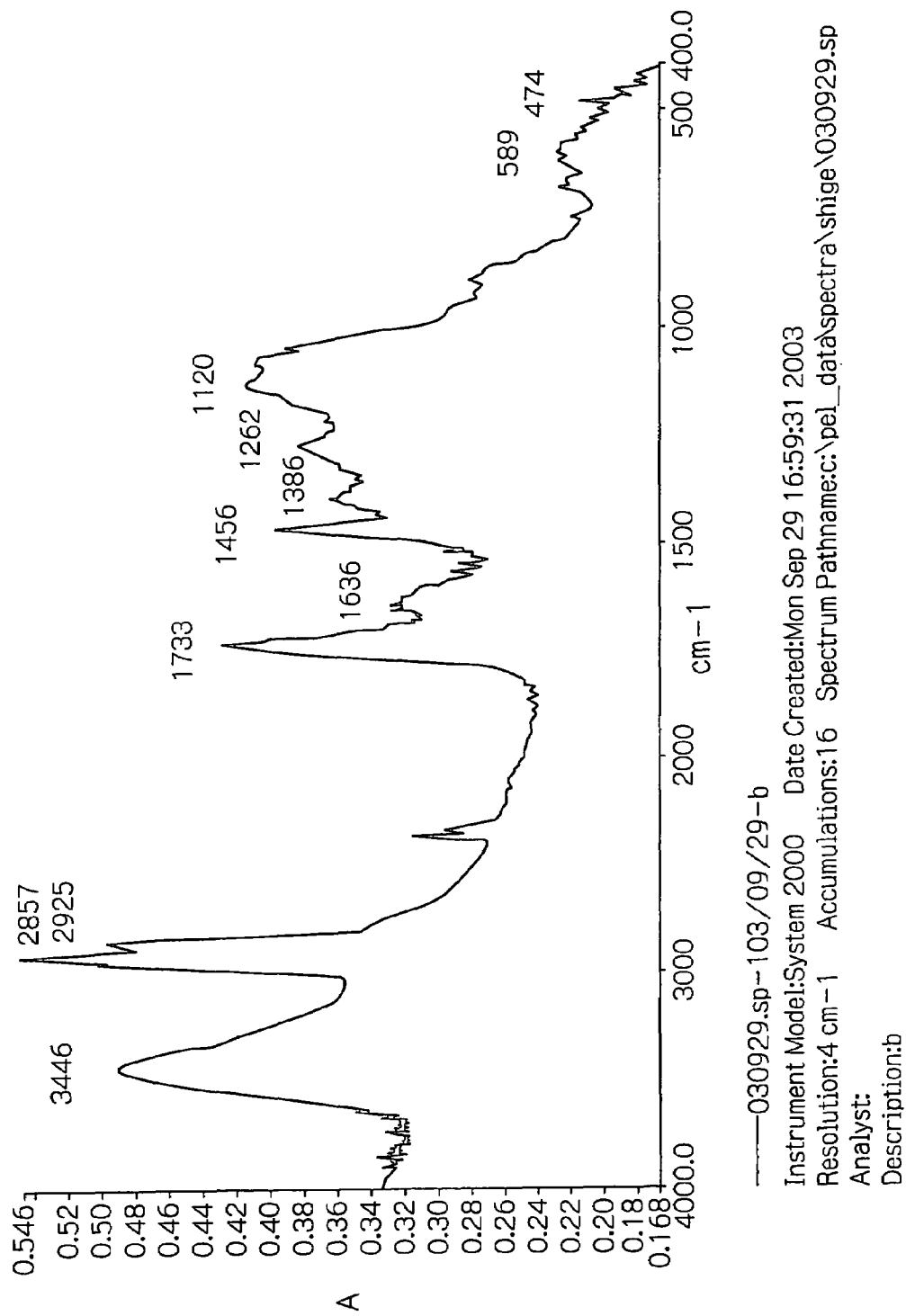
FIG. 4 shows the infrared absorption spectrum of a block copolymer of an aliphatic polyether ether ketone and polyether, obtained in Example 3.

One ml of glycerin (manufactured by KANTO CHEMICAL Co., Inc.) and 100 μl of concentrated sulfuric acid (a 96% aqueous solution, manufactured by KANTO CHEMICAL Co., Inc.) are mixed, and stirred sufficiently. The mixed solution is heated at 150° C. for 5 minutes (hereinafter, referred to as mixed solution A). One ml of ethylene glycol (manufactured by KANTO CHEMICAL Co., Inc.) and 100 μl of concentrated sulfuric acid (a 96% aqueous solution, manufactured by KANTO CHEMICAL Co., Inc.) are mixed, and stirred sufficiently. The mixed solution is heated at 150° C. for 5 minutes (hereinafter, referred to as mixed solution B). Then, 1 ml of the mixed solution A and 1 ml of the mixed solution B are mixed, and stirred sufficiently, and the resultant mixed solution is dripped onto a glass substrate, and the resultant layer is heated at 190° C. for 15 minutes. The infrared absorption spectrum of the product thus obtained (see FIG. 4) shows absorption of a carbonyl group at 1733 $cm^{-1}$ and that of an ether group at 1120 $cm^{-1}$. Accordingly, it was confirmed that a block copolymer of aliphatic polyether ketone having a structural unit represented by structural formula (2), and polyether (a block copolymer having a structural unit represented by formula (1) and that represented by formula (4) (n1 of 60, l of 40, k of 2, $R_1$ and $R_2$ being H, weight-average molecule weight of 6,100, a ratio of ether groups to ketone groups of 100/40)) could be obtained.

Various properties of the block copolymer plastic are shown below:

| | |
|---|---|
| Modulus of elasticity: | 1 GPa |
| Thermal decomposition temperature: | 380° C. |
| Electrical conductivity: | $10^{-10}$ S/cm |

Example 3-1

A block copolymer of aliphatic polyether ketone in which carbon nanotubes are dispersed and polyether is obtained in the same manner as in Example 3 except that 0.15 g of carbon nanotubes modified by carboxylic acid (carbon nanotubes prepared in the same manner as in Example 1-1) are used as another raw material.

Various properties of the block copolymer plastic in which carbon nanotubes are dispersed are shown below:

| | |
|---|---|
| Modulus of elasticity: | 5 GPa |
| Thermal decomposition temperature: | 380° C. |
| Electrical conductivity: | $10^{-2}$ S/cm |

Example 3-2

A block copolymer of aliphatic polyether ketone and polyether having a hydroxyl group is obtained in the same manner as in Example 3-1 except that concentrated nitric acid (a 60% aqueous solution, manufactured by KANTO CHEMICAL Co., Inc.) is used in place of concentrated sulfuric acid as catalysts of the mixed solutions A and B. The block copolymer is a gel substance. However, the aliphatic polyether ketone sites of the block copolymer partially have a structure in which the ketone group is replaced with a hydroxyl group (structure represented by formula (5)).

After the gel substance is applied to a substrate, the resultant layer is heated at 150° C. to obtain a film-state plastic structure. This can provide a film-state plastic structure having the same properties as those of the plastic obtained in Example 3-1.

What is claimed is:

1. A method of preparing an aliphatic polymer having a ketone group in a main chain thereof, wherein polyhydric alcohol as a raw material of the aliphatic polymer is polymerized in the presence of a catalyst, and the polyhydric alcohol is a polyether polyol which contains a secondary alcohol group and a primary alcohol group in a single molecule.

2. The method of preparing an aliphatic polymer having a ketone group in a main chain thereof according to claim 1, wherein the catalyst is an oxidation catalyst for a hydroxyl group of the polyhydric alcohol.

3. The method of preparing and aliphatic polymer having a ketone group in a main chain thereof according to claim 1, wherein the catalyst is a dehydration catalyst for a hydroxyl group of the polyhydric alcohol.

4. The method of preparing an aliphatic polymer having a ketone group in a main chain thereof according to claim 1, wherein the catalyst is an aqueous solution.

5. The method of preparing an aliphatic polymer having a ketone group in a main chain thereof according to claim 1, wherein the catalyst is volatile.

6. The method of preparing an aliphatic polymer having a ketone group in a main chain thereof according to claim 1, wherein the catalyst is nonvolatile, and is thermally decomposed at a temperature equal to or lower than the decomposition temperature of the aliphatic polymer having a ketone group in a main chain thereof.

7. The method of preparing an aliphatic polymer having a ketone group in a main chain thereof according to claim 1, wherein the catalyst contains at least one selected from sulfuric acid, nitric acid, hydrogen peroxide, $Na_2Cr_2O_7$, $CrO_3Cl$, and NaOCl.

8. The method of preparing an aliphatic polymer having a ketone group in a main chain thereof according to claim 1, wherein the catalyst is sulfuric acid.

9. The method of preparing an aliphatic polymer having a ketone group in a main chain thereof according to claim 1, wherein a mixture of the polyhydric alcohol and a diol compound is used as a raw material to polymerize the polyhydric alcohol and the diol compound.

10. The method of preparing an aliphatic polymer having a ketone group in a main chain thereof according to claim 1, wherein the raw material is heated during polymerization.

11. The method of preparing an aliphatic polymer having a ketone group in a main chain thereof according to claim 1, wherein the raw material is heated by an electromagnetic wave during polymerization.

12. The method of preparing an aliphatic polymer having a ketone group in a main chain thereof according to claim 1, wherein the polymerization is conducted such that a hydroxyl group remains in a resultant polymer.

13. A method of preparing a composition containing an aliphatic polymer having a ketone group in a main chain thereof, comprising polymerizing polyhydric alcohol as a raw material of the aliphatic polymer in the presence of a catalyst, wherein the polyhydric alcohol is a polyether polyol which contains a secondary alcohol group and a primary alcohol group in a single molecule.

14. The method of preparing a composition containing an aliphatic polymer having a ketone group in a main chain thereof according to claim 13, wherein the catalyst is an oxidation catalyst for a hydroxyl group of the polyhydric alcohol.

15. The method of preparing a composition containing an aliphatic polymer having a ketone group in a main chain thereof according to claim 13, wherein the catalyst is a dehydration catalyst for a hydroxyl group of the polyhydric alcohol.

16. The method of preparing a composition containing an aliphatic polymer having a ketone group in a main chain thereof according to claim 13, wherein the catalyst is an aqueous solution.

17. The method of preparing a composition containing an aliphatic polymer having a ketone group in a main chain thereof according to claim 13, wherein the catalyst is volatile.

18. The method of preparing a composition containing an aliphatic polymer having a ketone group in a main chain thereof according to claim 13, wherein the catalyst is nonvolatile, and is thermally decomposed at a temperature equal to or less than the decomposition temperature of the aliphatic polymer having a ketone group in a main chain thereof.

19. The method of preparing a composition containing an aliphatic polymer having a ketone group in a main chain thereof according to claim 13, wherein the catalyst contains at least one selected from sulfuric acid, nitric acid, hydrogen peroxide, $Na_2cr_2O_7$, $CrO_3Cl$ and $NaOCl$.

20. The method of preparing a composition containing an aliphatic polymer having a ketone group in a main chain thereof according to claim 13, wherein the catalyst is sulfuric acid.

21. The method of preparing a composition containing an aliphatic polymer having a ketone group in a main chain thereof according to claim 13, wherein a mixture of the polyhydric alcohol and a diol compound is used as a raw material to polymerize the polyhydric alcohol and the diol compound.

22. The method of preparing a composition containing an aliphatic polymer having a ketone group in a main chain thereof according to claim 13, wherein the raw material is heated during polymerization.

23. The method of preparing a composition containing an aliphatic polymer having a ketone group in a main chain thereof according to claim 13, wherein the raw material is heated by an electromagnetic wave during polymerization.

24. A method of preparing a composition containing an aliphatic polymer having a ketone group in a main chain thereof, comprising polymerizing polyhydric alcohol which contains a secondary alcohol group and a primary alcohol group in a single molecule and is a raw material of the aliphatic polymer in the presence of a catalyst, wherein the raw material is polymerized such that a hydroxyl group remains in a resultant polymer to obtain a gel substance, and the gel substance is supplied onto a substrate, and then heated and hardened.

25. A method of preparing a composition containing an aliphatic polymer having a ketone group in a main chain thereof, comprising polymerizing polyhydric alcohol which contains a secondary alcohol group and a primary alcohol group in a single molecule and is a raw material of the aliphatic polymer in the presence of a catalyst, wherein the polyhydric alcohol and an electrically conductive powder are used as the raw material.

26. The method of preparing a composition containing an aliphatic polymer having a ketone group in a main chain thereof according to claim 25, wherein the electrically conductive powder is metal particles.

27. The method of preparing a composition containing an aliphatic polymer having a ketone group in a main chin thereof according to claim 25, wherein the electrically conductive powder is at least one of carbon nanotubes and carbon nanotubes modified by a functional group.

28. The method of preparing a composition containing an aliphatic polymer having a ketone group in a main chain thereof according to claim 25, wherein the electrically conductive powder is carbon nanotubes modified by a functional group with which the polyhydric alcohol is polymerized.

29. The method of preparing a composition containing an aliphatic polymer having a ketone group in a main chain thereof according to claim 28, wherein the functional group is carboxylic acid.

* * * * *